United States Patent [19]

Roberts

[11] 4,296,845
[45] Oct. 27, 1981

[54] ANCHOR PLATE FOR A DRUM BRAKE ASSEMBLY

[75] Inventor: James K. Roberts, South Bend, Ind.

[73] Assignee: The Bendix Corporation, South Bend, Ind.

[21] Appl. No.: 73,754

[22] Filed: Sep. 10, 1979

[51] Int. Cl.³ ............................................. F16D 51/00
[52] U.S. Cl. .............................. 188/341; 188/206 A; 188/328; 188/340
[58] Field of Search ............... 188/341, 340, 327, 328, 188/333, 329, 330, 206 A, 250 F, 335, 78, 250 A, 79.5 GT

[56] References Cited

U.S. PATENT DOCUMENTS

| | | | |
|---|---|---|---|
| 2,164,878 | 7/1939 | Main | 188/341 X |
| 2,509,643 | 5/1950 | House | 188/341 |
| 2,942,696 | 6/1960 | House | 188/78 |
| 3,283,858 | 11/1966 | Mossey et al. | 188/341 |
| 3,351,159 | 11/1967 | Burnett | 188/341 |
| 4,101,011 | 7/1978 | Burnett | 188/79.5 GT |

*Primary Examiner*—Douglas C. Butler

*Attorney, Agent, or Firm*—Leo H. McCormick, Jr.; Ken C. Decker

[57] ABSTRACT

An anchor plate is disclosed for a drum brake assembly having a backing plate and a pair of brake shoes arranged in end-to-end relationship thereon. The anchor plate engages a knob integral with the backing plate, the knob extending from the backing plate a distance to extend into the plane defined by the brake shoe webs. The backing plate knob defines a pair of knob faces, each knob face facing a corresponding brake shoe web. Disposed in overlying and force-fit engagement with the knob is an anchor plate of thin material having a planar surface and two substantially perpendicular tabs extending therefrom. The tabs define load bearing surfaces for receiving the brake shoe webs. The tabs are spaced apart a distance equal to, but preferably slightly less than, the distance between the knob faces for snug intereference fit therewith. The planar top surface of the anchor plate has, integral therewith, retaining tabs extending substantially parallel to, and overlying the brake shoe webs. The anchor plate is preferably secured to the knob by a single rivet that passes through complementary openings in the anchor plate and knob.

4 Claims, 7 Drawing Figures

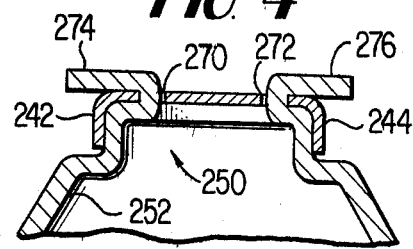
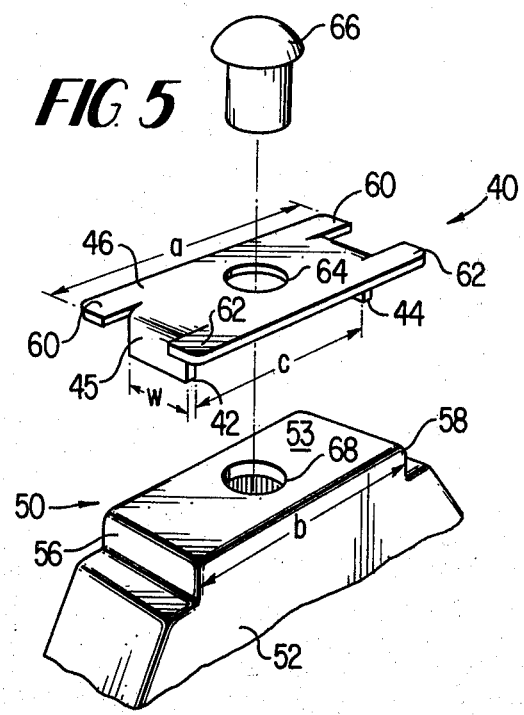
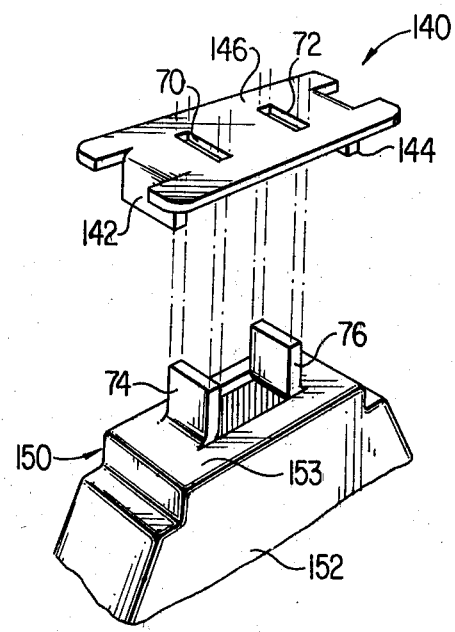
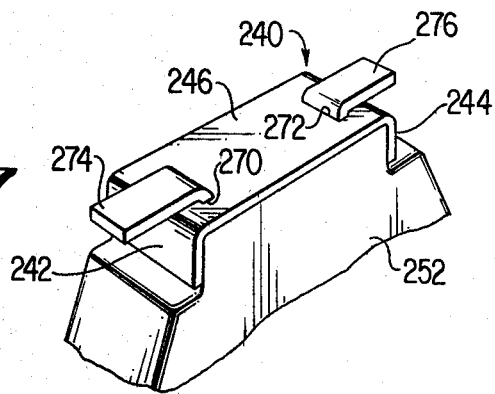

ANCHOR PLATE FOR A DRUM BRAKE ASSEMBLY

BACKGROUND OF THE INVENTION

Drum brake assemblies, particularly of the non-servo type, provide for a pair of brake shoes arranged in end-to-end relationship supported on a backing plate that is interconnected with a stationary part of the vehicle. A hydraulic actuator is disposed between two ends of the brake shoes, receiving the brake shoe webs; while an anchor assembly is disposed adjacent the other two ends of the brake shoes opposite the hydraulic actuator. The anchor assembly receives and transmits forces from the liningdrum boundary, through the backing plate, to a stationary part of the vehicle, such as the vehicle axle flange. The anchor assembly may also include a retainer assembly for retaining portions of the brake shoes, particularly the brake shoe webs, in engagement with an anchor bearing surface and in axial alignment therewith.

Anchor assemblies, such as those illustrated in U.S. Pat. Nos. 4,101,011 and 3,283,858, include an anchor block providing bearing surfaces for engaging the brake shoe webs, a separate retainer or guide plate overlying the anchor block, and a pair of rivets extending through both of such members for securing the assembly to the backing plate. Such assemblies are costly to manufacture and to assemble, requiring an inordinate number of parts. Moreover, such assemblies require a solid block of material serving as the bearing or anchor plate, thus increasing the overall weight of the brake assembly. In addition, forces transmitted from the brake shoes to the backing plate are taken up by the rivets, thus localizing the high forces that may occur.

Anchor assemblies, such as those illustrated in U.S. Pat. No. 2,509,643, provide for an anchor block for receiving the brake shoe webs and having retaining projections unitary with the block overlying the brake shoe webs. The anchor block is spot welded directly onto the backing plate. Nibs on the anchor block mate with openings in the backing plate to take up the braking forces. Such assemblies are costly to manufacture and fail to avoid high stress buildup localized at the nib-opening interface.

Anchor assemblies, such as those illustrated in U.S. Pat. Nos. 2,942,696, and 3,351,159, provide for portions of the brake shoe webs to directly contact raised portions of the backing plate. Since backing plates are generally of relatively soft metal, deformities in the backing plate can occur. Alternatively, the backing plate must be reinforced at the bearing area, resulting in undesirable increases in overall weight of the brake assembly.

SUMMARY OF THE INVENTION

The present invention provides for an anchor plate for a drum brake assembly, particularly a non-servo type drum brake assembly. The drum brake assembly includes a backing plate having a knob, or boss, integral therewith and extending axially from the backing plate, i.e., in a direction along the wheel axle, a distance sufficient to receive end portions of the brake shoes, such as the brake shoe webs. The knob includes a pair of knob faces, each facing a respective brake shoe web. An anchor plate fits over the knob and includes a pair of load bearing tabs, having oppositely facing load bearing surfaces, that overlie the knob faces to receive the brake shoe webs. Preferably, the load bearing tabs act as a spring clip to provide a force-fit over the knob with zero clearance between the knob faces and the tabs. Preferably, the anchor plate includes a plurality of retaining tabs, unitary therewith, overlying, and substantially parallel to, the brake shoe webs in order to maintain the webs in engagement, and axial alignment, with the load bearing surfaces of the tabs. The anchor plate of the present invention is secured to the knob, by either a single rivet or a tab extending from the knob. Engagement between the tabs and the knob faces prevent the anchor plate from rotating relative to the knob.

It is an object of the present invention to provide an anchor assembly for a drum brake, preferably a non-servo type drum brake, that is simple to manufacture, of light weight, requiring a minimum number of parts, and easily assembled. In particular, it is an object of the present invention to provide an anchor plate that fits over a raised or embossed portion of a backing plate, in engagement therewith, to provide a bearing surface between the brake shoe webs and the embossed backing plate for receiving the brake shoe webs.

It is further an object of the present invention to eliminate the requirement of a separate anchor block and retaining plate by providing a unitary element having load bearing surfaces and retaining tabs.

Still further, it is an object of the present invention to provide for an anchor assembly having a minimum number of parts, and of light weight and yet capable of withstanding brake forces. In particular, it is an object of the present invention to transmit forces from the brake shoe webs to the backing plate over a greater area, thus distributing the forces more evenly and minimizing likelihood of separation or undesirable orientation of the anchor plate with respect to the backing plate. It is an object of the invention to transmit forces from the brake shoe webs through the backing plate while eliminating any risk of backing plate deformity by providing an overlying anchor plate portion to receive the brake shoe forces from the brake shoe webs.

Still further, it is an object of the invention to minimize the number of parts or steps in securing an anchor assembly to the backing plate. The present invention provides for a single rivet or tabs extending from the backing plate to secure the anchor plate to the embossed portion of the backing plate. The use of a single rivet minimizes weight. The load bearing tabs on the anchor plate engage the knob faces on the backing plate to prevent relative movement therebetween.

Further objects of the present invention will become apparent when reference is made to the following description and the accompanying drawings.

BRIEF DESCRIPTION OF THE DRAWINGS

FIG. 4 is a cross-sectional view of an alternate embodiment of the anchor plate assembly of the present invention;

FIG. 5 is an exploded perspective view of the embodiment of FIG. 2;

FIG. 6 is an exploded perspective view of the embodiment of FIG. 3; and

FIG. 7 is a perspective view of the embodiment of FIG. 4.

DETAILED DESCRIPTION OF THE DRAWINGS

Figure 1:
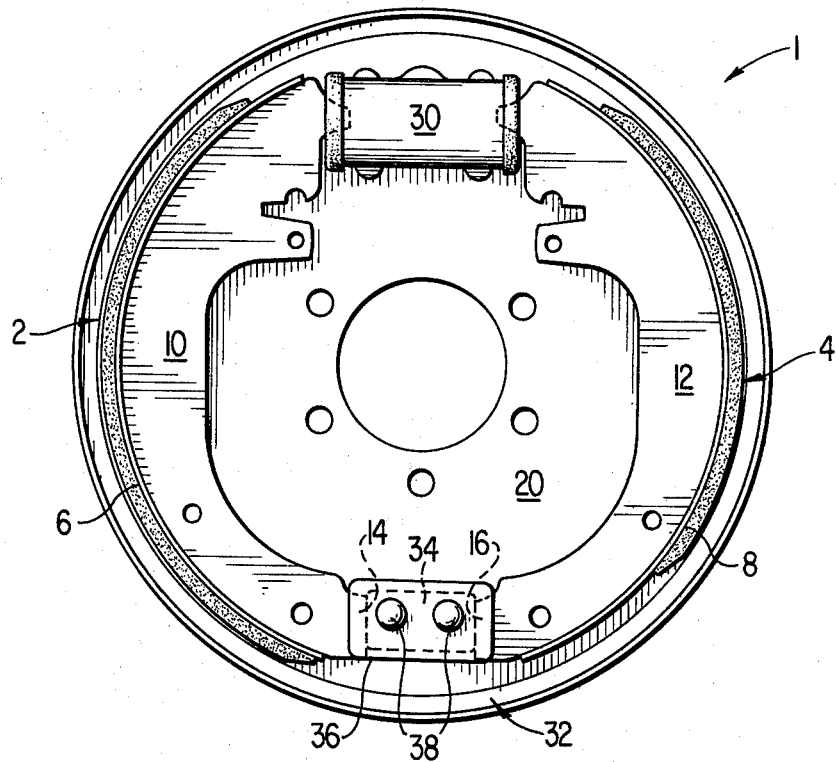
FIG. 1 is a front elevational view of a partial brake assembly.

A drum brake assembly 1 of the non-servo type has its basic elements depicted in FIG. 1. The drum brake assembly includes a pair of brake shoes 2, 4 having arcuate rims 6, 8 and substantially planar webs extending transversely from the rim. The two planar webs 10, 12 lie substantially in the same plane. The two brake shoes 2, 4 are arranged in end-to-end relationship on a backing plate 20 affixed to a non-rotating portion of the wheel assembly. A hydraulic actuator 30 is supporting on the backing plate 20 and engages opposite ends of the brake shoe webs. Disposed opposite to the hydraulic actuator is a typical prior art anchor assembly 32. The anchor assembly 32 includes an anchor block 34 mounted upon the backing plate 20, and a retainer plate 36 overlying the anchor block and overlying the end portions 14, 16 of the brake shoe webs 10, 12 to retain the webs in contact with the anchor block, and preventing axial movement of the webs. A pair of rivets 38 are shown which rivet the retaining plate and the anchor block to a surface of the backing plate. Other components of the drum brake assembly, such as return springs, etc., have been omitted from FIG. 1 for purposes of illustration.

Figure 2:
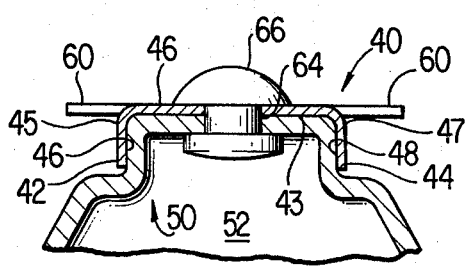
FIG. 2 is a cross-sectional view of the preferred embodiment of the anchor plate assembly of the present invention.

A preferred embodiment of the anchor plate 40 of the present invention is shown in FIGS. 2 and 5 and is positioned on the backing plate in the same location as the prior art anchor assembly 32, as shown in FIG. 1. The anchor plate 40 is preferably stamped from thin spring-steel stock. The plate 40 is substantially rectangular in shape, having rounded corners. A typical thickness for the plate is approximately 0.8 mm. Other plate shapes may be utilized without detracting from the plate function.

A pair of load bearing tabs 42, 44 are defined from opposite end edges of the plate, centrally therefrom, and extend substantially perpendicular to the plane of the top surface 46. The length a along the major dimension of the plate is greater than the length b of a complementary knob 50 on the backing plate 52. The spacing c between the inner faces 46, 48 of the load bearing tabs is not greater than, and is preferably less than, the spacing b between complementary knob faces 56, 58 on the backing plate 52. The underside 43 of the top planar section 46 of the anchor plate 40 engages a complementary planar surface 53 on the knob 50 between the knob faces 56, 58.

The load bearing tabs 42, 44 have inner surfaces 46, 48 that tightly engage, preferably with a force-fit, the complementary knob faces 56, 58. There is zero clearance between the inner surfaces of the load bearing tabs 42, 44 and the knob faces 56, 58. The load bearing tabs 42, 44 may act as spring clips for engagement with the knob 50.

The load bearing tabs 42, 44 have outwardly facing surfaces 45, 47 that define load bearing surfaces for receiving the brake shoe webs 10, 12. Preferably, the load bearing tabs 42, 44 are heat-treated for strength.

The tab length, from the underside 43 of the planar top surface to the tab ends, is sufficiently great to accommodate the brake shoe webs. The thickness of the brake shoe webs is substantially less than the tab length.

The tab width w must be sufficient to be in contact with the webs through the full range of brake shoe movement.

Adjacent to each central load bearing tab 42, 44, and integral and coplanar with the top surface 46 of the anchor plate, are a pair of retaining tabs 60, 62. The retaining tabs 60, 62 are substantially parallel to the brake shoe webs, and overlie at least end portions 14, 16 of the brake shoe webs 10, 12. Should the brake shoe webs move axially, i.e., in a direction along the wheel axle, the retaining tabs 60, 62 will retain the webs from sliding off the load bearing surfaces 45, 47, thus maintaining the end portions 14, 16 of the brake shoe webs 10, 12 in engagement with the load bearing surfaces 45, 47.

Stamped centrally in the top surface 46 of the anchor plate 40 is an opening 64 for receiving a rivet 66. The opening 64 is complementary with a similar-sized opening 68 on the top surface 53 of the knob 50 of the backing plate 52. Only a single rivet is necessary to maintain the anchor plate to the knob. The width of the load bearing tabs 42, 44, in engagement with the knob faces 56, 58, ensures that the anchor plate 40 will not twist or pivot about the rivet, thus preventing misalignment between the anchor plate and the knob of the backing plate.

Figure 3:
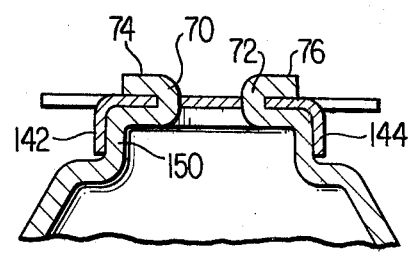
FIG. 3 is a cross-sectional view of an alternate embodiment of the anchor plate assembly of the present invention.

An alternate embodiment is shown in FIGS. 3 and 6. In this embodiment, a pair of openings 70, 72 are disposed in the top planar surface 146 of the anchor plate 140. These openings are adapted to receive hold-down tangs 74, 76 extending from the top surface 153 of the knob 150 of the backing plate 152. The tangs 74, 76 are bendable either toward the center of the plate, or preferably toward the outside lateral edges of the plate to retain the plate to the knob. As in the preferred embodiment, the load bearing tabs 142, 144 provide a force-fit with the complementary knob 150, thus assisting in retaining the anchor plate to the knob.

Another embodiment is shown in FIGS. 4 and 7. In this embodiment, the load bearing tabs 242, 244 are defined by the entire lateral edge portion of the anchor plate 240. No retaining members are formed integral with the plate. Rather, a pair of tangs 274, 276 extending from the top surface of the knob 250 extend through openings 270, 272 in the top surface 246 of the anchor plate 240, and are bent in a direction to overlie the brake shoe webs. The length of the tangs 274, 276 is sufficient to extend beyond the load bearing tabs 242, 244 and in overlying engagement with the brake shoe web ends 14, 16 to act as a retaining member. It should be noted that in this embodiment, the openings 270, 272 through the anchor plate can be slightly oversized and having one edge defined by the opening bent downwardly, or louvered (not shown). After insertion of a tang through the opening, the louvered side of the opening is reformed against the tang to provide a more secure fit.

The anchor plate 40, described above, is fitted upon a knob, or raised portion 50, of a backing plate 52 adjacent the ends 14, 16 of the brake shoe webs 10, 12. The knob or raised portion 50 is preferably embossed from the plate 52. A pair of knob faces 56, 58, preferably planar and substantially perpendicular to the plane defined by the planar brake shoe webs 10, 12 extend axially from the backing plate 52. The knob faces 56, 58 are preferably coined to provide greater dimensional precision at the faces. A substantially planar top surface 53 extends between the knob faces 56, 58 to engage the underside 43 of the planar top surface 46 of the anchor plate 40. The distance b between the knob faces 56, 58 are at least equal to, and preferably slightly greater than, the distance c between the inner surfaces 46, 48 of the load bearing tabs 42, 44 of the anchor plate 40, thus assuring a snug interference fit with the overlying anchor plate tabs 42, 44. The knob faces 56, 58 extend axially (i.e., in a line parallel to the wheel axle) into the plane defined by the brake shoe webs 10, 12. The knob faces 56, 58 provide abutment surfaces for receiving forces from the brake shoe webs 10, 12 through the load bearing tabs 42, 44 of the anchor plate 40. The knob faces 56, 58 must have a height sufficient to accommodate the entire length of the load bearing tabs 42, 44 when the anchor plate 40 is in its operative position over the knob 50, as shown in FIG. 2.

In the preferred embodiment, the top surface 53 of the knob 50 that engages the underside 43 of the anchor plate 40 defines an opening 68 communicating with the opening 64 in the anchor plate 40. The anchor plate 40 is riveted to the backing plate 52 by means of a rivet 66 that passes through the complementary openings 64, 68.

In both of the alternate embodiments, the backing plate 152, 252 is provided with tangs (74, 76, FIG. 6; 274, 276, FIG. 7) extending from the top surface of the plate. Preferably these tangs are integral with the backing plate, cut therefrom, and positioned upwardly, substantially perpendicular to the top surface. The tangs are complementary with openings in the anchor plate which receive the tangs. The tangs are then bent downward in one of two directions to engage the anchor plate. In the embodiment of FIGS. 4 and 7, the tangs 274, 276 are the sufficient in length to extend beyond the load bearing surfaces 242, 244 of the anchor plate 240 to overlie the brake shoe webs. The tangs of both embodiments can be separate elements secured in a conventional manner, such as by welding, to the anchor plate.

Above, specific embodiments of the present invention have been described. It should be appreciated, however, that these embodiments were described for purposes of illustration only, without any intention of limiting the scope of the present invention. Rather, it is the intention of the present invention to be limited not by the above but only as is defined in the appended claims.

What is claimed is:

1. In a drum brake assembly having a backing plate and a pair of brake shoes arranged in end-to-end relationship on said backing plate, each brake shoe comprising an arcuate rim and a substantially planar web extending transversely from said rim, the improvement comprising said backing plate having an embossed knob adjacent one end of the shoes and defining a pair of knob faces extending into the plane defined by the planar webs;

an anchor plate being force-fit into overlying engagement with said knob, said anchor plate having a substantially rectangular plate with three tabs located along two opposite edges of the plate, the central tab of said three tabs extending substantially perpendicular to said plate and defining a load bearing tab, the two tabs adjacent said central tab lying coplanar with said plate and overlying said planar webs to retain said webs in engagement with said load bearing tab; and retaining means for securing said anchor plate to said knob.

2. The drum brake assembly of claim 1 wherein said retaining means comprises complementary openings defined by said anchor plate and said knob, and a single rivet extending through the openings.

3. The drum brake assembly of claim 1 wherein said retaining means comprises at least one opening defined by said anchor plate, and at least one bendable tang extending from the knob through the anchor plate opening, and bent into engagement with the anchor plate.

4. The drum brake assembly of claim 3, wherein said bendable tang, when bent into engagement with the anchor plate, lies substantially parallel to, and overlies, a planar web.

* * * * *